United States Patent
Banerjee et al.

(10) Patent No.: US 12,309,027 B2
(45) Date of Patent: May 20, 2025

(54) COORDINATION AND CONTROL MECHANISM FOR CONFLICT RESOLUTION FOR NETWORK AUTOMATION FUNCTIONS

(71) Applicant: Nokia Technologies Oy, Espoo (FI)

(72) Inventors: Anubhab Banerjee, Munich (DE); Stephen S. Mwanje, Dorfen (DE)

(73) Assignee: NOKIA TECHNOLOGIES OY, Espoo (FI)

(*) Notice: Subject to any disclaimer, the term of this patent is extended or adjusted under 35 U.S.C. 154(b) by 146 days.

(21) Appl. No.: 17/995,747

(22) PCT Filed: Apr. 22, 2020

(86) PCT No.: PCT/EP2020/061183
§ 371 (c)(1),
(2) Date: Oct. 7, 2022

(87) PCT Pub. No.: WO2021/213644
PCT Pub. Date: Oct. 28, 2021

(65) Prior Publication Data
US 2023/0188417 A1    Jun. 15, 2023

(51) Int. Cl.
*H04L 41/0823* (2022.01)
*H04L 41/0873* (2022.01)

(52) U.S. Cl.
CPC ...... *H04L 41/0823* (2013.01); *H04L 41/0873* (2013.01)

(58) Field of Classification Search
None
See application file for complete search history.

(56) References Cited

U.S. PATENT DOCUMENTS

| | | | |
|---|---|---|---|
| 2016/0127985 A1* | 5/2016 | Kayargadde | H04W 36/0016 455/435.2 |
| 2019/0273662 A1* | 9/2019 | Mwanje | H04W 24/02 |
| 2021/0012183 A1* | 1/2021 | Elsken | G06N 3/082 |
| 2023/0171158 A1* | 6/2023 | Mwanje | H04L 41/16 709/224 |

FOREIGN PATENT DOCUMENTS

| | | |
|---|---|---|
| WO | 2012/072445 A1 | 6/2012 |
| WO | 2018/233818 A1 | 12/2018 |

OTHER PUBLICATIONS

Sarika et al., "Agenttab: An agent based approach to detect tabnabbing attack", Procedia Computer Science, vol. 46, 2015, pp. 574-581.

(Continued)

*Primary Examiner* — William G Trost, IV
*Assistant Examiner* — Christopher P Cadorna
(74) *Attorney, Agent, or Firm* — Lippes Mathias LLP

(57) ABSTRACT

An apparatus and a method are provided, by which a controller receives configuration sets from at least two network automation functions, each network automation function determining the configuration set such that it is optimal for achieving an objective of the network automation function. The controller determines an optimal network configuration based on the configuration sets received from the at least two network automation functions.

10 Claims, 8 Drawing Sheets

(56) References Cited

OTHER PUBLICATIONS

Khayyat et al., "An intelligent multi-agent based model for collaborative logistics systems", Transportation Research Procedia, vol. 12, 2016, pp. 325-338.
Rahimzadeh et al., "High reliable and efficient task allocation in networked multi-agent systems", Autonomous Agents and Multi-Agent Systems, vol. 29, 2015, pp. 1023-1040.
Gupta et al., "Cooperative multi-agent control using deep reinforcement learning", Autonomous Agents and Multiagent Systems, Nov. 25, 2017, pp. 66-83.
Liu et al., "A novel approach to task assignment in a cooperative multi-agent design system", Applied Intelligence, vol. 43, Jan. 18, 2015, pp. 162-175.
Bianchi et al., "Heuristically-Accelerated Multiagent Reinforcement Learning", IEEE Transactions on Cybernetics, vol. 44, No. 2, Feb. 2014, pp. 252-265.
Morstyn et al., "Cooperative Multi-Agent Control of Heterogeneous Storage Devices Distributed in a DC Microgrid", IEEE Transactions on Power Systems, vol. 31, No. 4, Jul. 2016, pp. 2974-2986.
Nash, "The Bargaining Problem", Econometrica, vol. 18, No. 2, Apr. 1950, pp. 155-162.
International Search Report and Written Opinion received for corresponding Patent Cooperation Treaty Application No. PCT/EP2020/061183, dated Dec. 16, 2020, 14 pages.
Mwanje et al., "Concurrent cooperative games for coordinating SON functions in cognitive cellular networks", IEEE International Symposium on Integrated Network Management (IM), May 11-15, 2015, pp. 1298-1303.
Banerjee et al., "Game theoretic Conflict Resolution Mechanism for Cognitive Autonomous Networks", International Symposium on Performance Evaluation of Computer and Telecommunication Systems (SPECTS), Jul. 20-22, 2020, 8 pages.

* cited by examiner

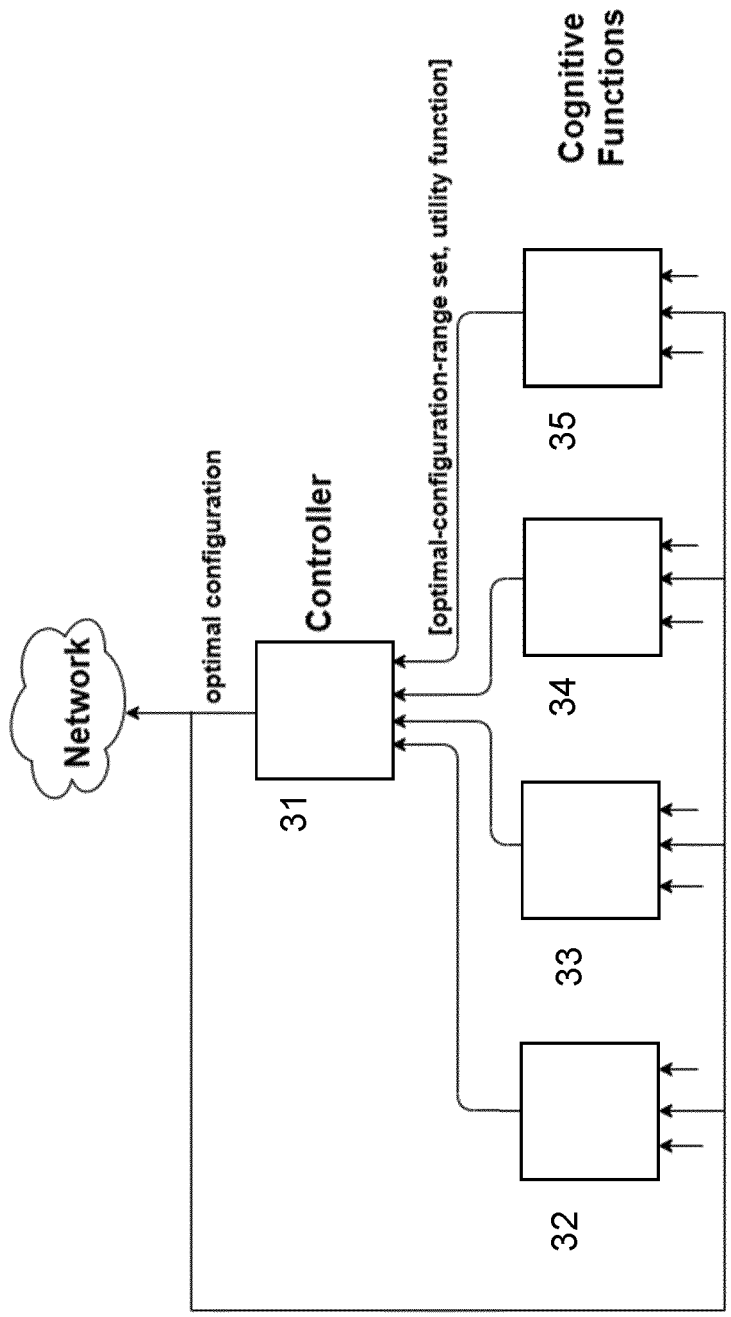

COORDINATION AND CONTROL MECHANISM FOR CONFLICT RESOLUTION FOR NETWORK AUTOMATION FUNCTIONS

RELATED APPLICATION

This application claims priority to PCT Application No. PCT/EP2020/061183, filed on Apr. 22, 2020, each of which is incorporated herein by reference in its entirety.

FIELD

The present disclosure relates to an apparatus, a method and a computer program product for providing a coordination and control mechanism for conflict resolution for network automation functions (e.g., cognitive functions).

RELATED BACKGROUND ART

The following meanings for the abbreviations used in this specification apply:
AQI Action Quality Indicator
CAN Cognitive Autonomous Network
CF Cognitive Function
MAS Multi-Agent System
NCP Network configuration parameter
QoS Quality of Service
RAT Radio Access Technology
SF SON Function
SON Self Organizing Network
UE User equipment Example embodiments, although not limited to this, relate to operations of network automation functions such as Cognitive Functions (CFs) in 5G (radio access) networks and other future generation of wireless/mobile networks. To address increasing operational complexity coming from introduction of new Radio Access Technologies (RATs), network automation exemplified by Self Organizing Networks (SON) is applied. SON deploys several closed-loop-control-based functions, called SON Functions (SFs), each of which manages a specific target individually. Atop these SFs, rule-based SON coordination hinders the possibility of conflict among the SFs. The successfulness of SON has been limited by two primary disadvantages—i) SFs cannot adapt in a rapidly changing environment, and, ii) existence of large number of rules makes maintenance and upgradation of the system difficult.

To overcome these shortcomings, Cognitive Autonomous Networks (CAN) replace SFs with Cognitive Functions (CFs). These functions are learning agents themselves and do not follow any pre-written rules.

SUMMARY

Example embodiments of the present disclosure aim to improve handling of network automation functions such as cognitive functions in cognitive autonomous networks.

According to a first aspect of the present disclosure, an apparatus is provided, which comprises at least one processor and at least one memory including computer program code, the at least one memory and the computer program code configured to, with the at least one processor, cause the apparatus at least to perform: receiving configuration sets from at least two network automation functions, each network automation function determining the configuration set such that it is optimal for achieving an objective of the network automation function, and determining an optimal network configuration based on the configuration sets received from the at least two network automation functions.

According to a second aspect, a method is provided, which comprises:
receiving configuration sets from at least two network automation functions, each network automation function determining the configuration set such that it is optimal for achieving an objective of the network automation function, and
determining an optimal network configuration based on the configuration sets received from the at least two network automation functions.

The first and second aspects may be modified as follows:

The optimal network configuration may be determined by solving a conflict among the at least two network automation functions in case a conflict arises between the at least two network automation function.

It may be determined that a conflict is present by determining that the configuration sets of the at least two network automation functions do not match with each other, and/or that utility functions received from the at least two network automation functions do not match with each other, the utility functions describing the input-output relationship of the network automation functions, respectively.

Each configuration set may comprise a range for a parameter having a minimum value and a maximum value, the parameter being the same for the configuration sets of the at least two network automation functions, wherein it may be determined that a conflict is present by checking whether the minimum values and/or the maximum values of ranges for the parameter of the configuration sets of the at least two network automation functions do not match with each other.

The optimal network configuration may be determined also based on the utility functions applied by the at least two network automation functions.

A request from at least one network automation function to re-determine the optimal network configuration may be received, the request comprising a modified configuration set, and, in response to receiving the modified configuration set, a request may be sent to at least one other network automation function to provide configuration sets.

An optimal network configuration may be a network configuration achieving the best performance target for a network metric, or may be a network configuration achieving a performance target for a network metric, which is higher than a certain threshold.

According to a third aspect, an apparatus, in a network automation function, is provided, which comprises at least one processor and at least one memory including computer program code, the at least one memory and the computer program code configured to, with the at least one processor, cause the apparatus at least to perform: determining a configuration set such that it is optimal for achieving an objective of the network automation function for providing an optimal network configuration, and sending the configuration set to a controller which controls at least two network automation functions.

According to a fourth aspect, a method, in a network automation function, is provide, the method comprising:
determining a configuration set such that it is optimal for achieving an objective of a network automation function for providing an optimal network configuration, and
sending the configuration set to a controller which controls at least two network automation functions.

The third and fourth aspects may be modified as follows:

The configuration set may be continuously or regularly determined, and the configuration set may be sent to the controller when the configuration set is changed with respect to a previously determined configuration set.

A utility function may be generated, which describes the input-output relationship of the network automation function, and the utility function may be sent together with the configuration set to the controller.

The configuration set may comprise a range for a parameter having a minimum value and a maximum value.

The configuration set may be sent to the controller upon receiving a request from the controller to provide the configuration set.

An optimal network configuration may be a network configuration achieving the best performance target for a network metric, or a network configuration achieving a performance target for a network metric, which is higher than a certain threshold.

According to a fifth aspect, a system is provided comprising an apparatus according to the first aspect and/or its modifications and at least two network automation entities according to the third aspect and/or its modifications.

According to a sixth aspect, a computer program product is provided which comprises code means for performing a method according to any one of the second and fourth aspects and/or their modifications when run on a processing means or module. The computer program product may be embodied on a computer-readable medium, and/or the computer program product may be directly loadable into the internal memory of the computer and/or transmittable via a network by means of at least one of upload, download and push procedures.

According to a seventh aspect, an apparatus is provided, which comprises means for receiving configuration sets from at least two network automation functions, each network automation function determining the configuration set such that it is optimal for achieving an objective of the network automation function, and means for determining an optimal network configuration based on the configuration sets received from the at least two network automation functions.

According to an eighth aspect, an apparatus, in a network automation function, is provided, comprising means for determining a configuration set such that it is optimal for achieving an objective of the network automation function for providing an optimal network configuration, and means for sending the configuration set to a controller which controls at least two network automation functions.

The seventh and eighth aspects may be modified similar to the first and third aspects, respectively.

BRIEF DESCRIPTION OF THE DRAWINGS

These and other objects, features, details and advantages will become more fully apparent from the following detailed description of example embodiments of the present disclosure which is to be taken in conjunction with the appended drawings, in which:

FIG. 3 shows a system including a controller and a plurality of cognitive functions according to an example embodiment, wherein input-output of the controller is illustrated.

DETAILED DESCRIPTION OF EXAMPLE EMBODIMENTS

Figure 1A:
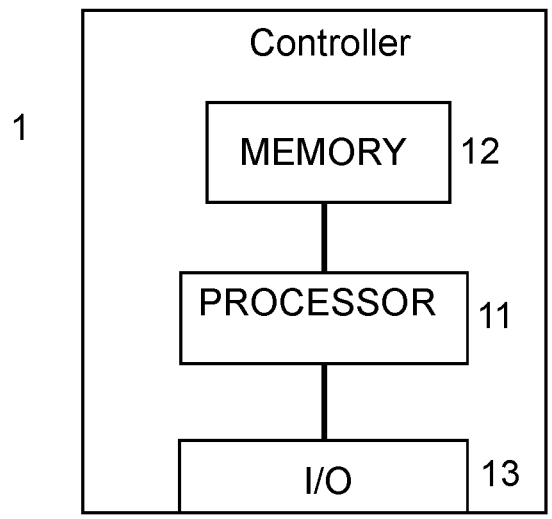
FIG. 1A shows a controller 1 according to an example embodiment.

In the following, description will be made to example embodiments of the present disclosure. It is to be understood, however, that the description is given by way of example only, and that the described example embodiments are by no means to be understood as limiting the present disclosure thereto.

Before describing example embodiments in detail, however, the problem underlying the present application is described in the following in some more detail.

As mentioned above, in order to overcome shortcomings due to the use of SFs, Cognitive Autonomous Networks (CAN) replace SFs with Cognitive Functions (CFs). These functions are learning agents themselves and do not follow any pre-written rules.

As in SON, CFs also encounter conflicts due to overlap in parameters or objectives. These conflicts can be of three primary types—i) configuration conflict, ii) measurement conflict, and, iii) characteristic conflict. However, for the cognitive autonomous network system, these conflicts cannot be resolved by a rule-based controller and some new method is required. Some example embodiments propose the design of a control and coordination mechanism which is able to—i) resolve all types of conflicts among the CFs dynamically (whenever the conflict arises), and, ii) determine the optimal configuration for the system.

In general, network automation functions work in parallel, often sharing the same resources but with different targets. The goal of CAN is to improve the adaptability and flexibility of the system by making these network automation functions cognitive. However, the problem of joint operation and configuration of multiple automation functions, which was already present in SON, becomes more imminent in CAN. For a better system performance, coordination among the functions sharing same resources is necessary and any kind of conflict among the functions has to be resolved as soon as it arises. Usually in case of SON, a rule-based SON coordinator atop the SFs is used to resolve conflicts among them. However, the same approach cannot be taken in CAN because of the architectural difference between them.

CAN can be visualized as a Multi-Agent System (MAS) where each agent has the following four properties:

P1. Each agent can learn and decide what is the best action for it by itself in a dynamic environment.

P2. No agent can communicate with each other and no one has a complete knowledge of the system.

P3. Some or all of these agents share the same resources and there exist conflicts of interests among them.

P4. Each agent tries to optimize its own target or goal simultaneously, and the concept of a common or team goal does not exist.

The main challenge with conflict resolution in the above system is—as the behaviour of a CF is dependent on its learning, and since the behaviour is unknown beforehand, if a conflict arises between two functions, no prior knowledge is available based on which conflict resolution rules can be defined. To resolve such conflicts, the conflict resolution mechanism has to fulfil two conditions:

1) be dynamic, i.e., the system is automated and able to resolve the conflict automatically the moment it arises, and 2) be generic, i.e., the solution mechanism is independent of the specific conflict of interest.

Therefore, example embodiments intend to propose a design of a coordination mechanism that can resolve conflicts of any type among the functions dynamically and determine the optimal configuration for the system.

In the following, a general overview of some example embodiments is described by referring to FIGS. 1A, 1B, 2A and 2B.

Figure 1B:
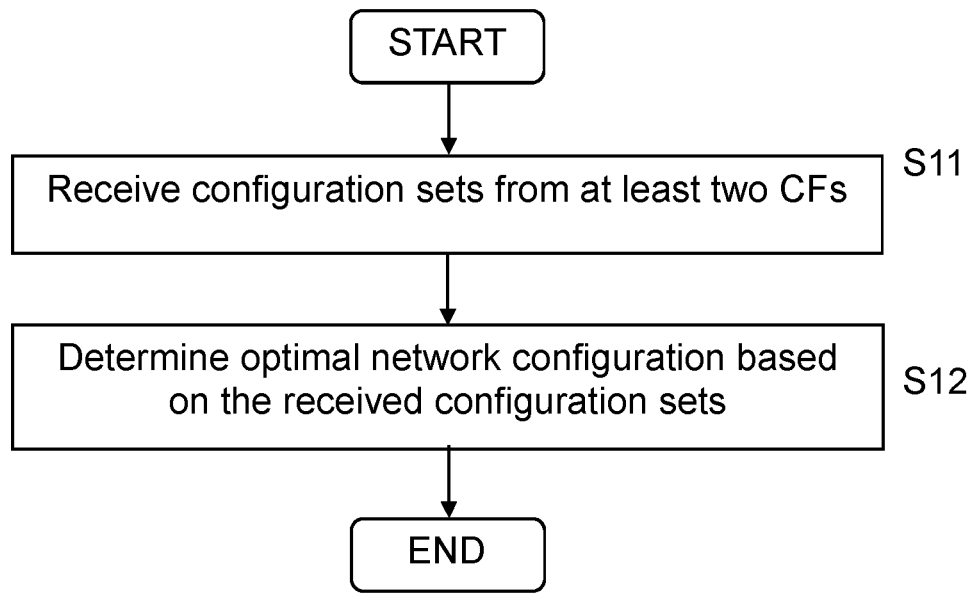
FIG. 1B shows a method carried out by the controller 1 according to the example embodiment.

FIG. 1A shows a controller 1 as an example for a first apparatus according to the present example embodiment. The controller can be any kind of network control device capable of carrying out the functions described in the following, and may be a part of a system. A procedure carried out by the controller 1 is illustrated in FIG. 1B.

The controller 1 comprises at least one processor 11 and at least one memory 12 including computer program code. The at least one processor 11, with the at least one memory 12 and the computer program code, is configured to cause the apparatus to perform: receiving (S11 in FIG. 1B) configuration sets from at least two network automation functions (e.g., CF 2 shown in FIG. 2A), each network automation function determining the configuration set such that it is optimal for achieving an objective of the network automation function, and determining (S12 in FIG. 1B) the optimal network configuration based on the configuration sets received from the at least two network automation functions.

Figure 2A:
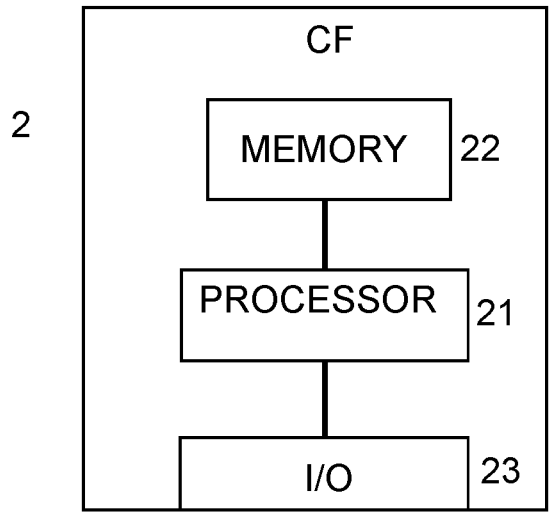
FIG. 2A shows a cognitive function (CF) 2 according to an example embodiment.
Figure 2B:
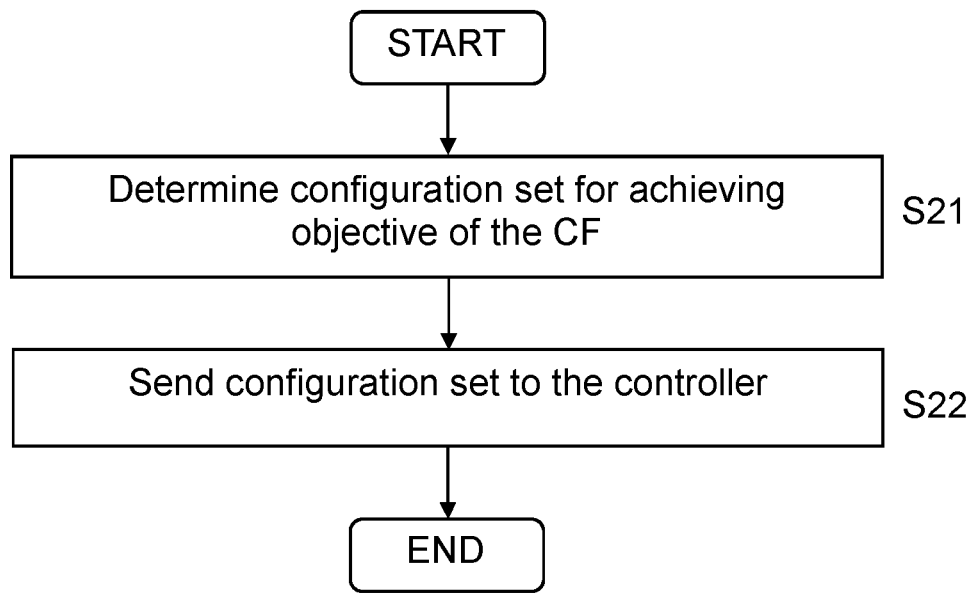
FIG. 2B shows a method carried out by the CF 2 according to the example embodiment.

FIG. 2A shows a cognitive function (CF) 2 as an example for a second apparatus according to the present example embodiment. The second apparatus is not limited to a cognitive function, but may be any kind of network automation function. In particular, the second apparatus or the network automation function does not necessarily have to be a learning function. A procedure carried out by the CF 2 is illustrated in FIG. 2B.

The CF 2 comprises at least one processor 21 and at least one memory 22 including computer program code. The at least one processor 21, with the at least one memory 22 and the computer program code, is configured to cause the apparatus to perform: determining (as shown in S21 of FIG. 2B) a configuration set such that it is optimal for achieving an objective of the network automation function for providing an optimal network configuration, and sending (S22) the configuration set to a controller (e.g., the controller 1 shown in FIG. 1A) which controls at least two network automation functions.

The controller 1 may further comprise an I/O unit 13, which is capable of transmitting to and receiving from other network elements, and the CF 2 may further comprise an I/O unit 23, which is capable of transmitting to and receiving from other network elements.

Thus, according to some example embodiments as described above, a controller 1 controls at least two network automation functions, e.g., cognitive functions (CFs). The network automation functions provide the controller with configuration sets which are determined by the network automation functions. The controller determines an optimal network configuration based on the received configuration sets.

Thus, with the controller an entity is provided, which is on a higher level than the network automation functions and which controls it. For example, the controller may solve conflicts between the network automation functions and may determine the optimal network configuration by solving conflicts.

Hence, an advantage is achieved that a way is provided how several network automation functions (e.g., learning entities such as CFs), each of which works independently, can work together and resolve conflicts rising among them. In particular, a mechanism for network automation functions is provided to resolve conflicts prior to executing actions and determine optimal configuration in a dynamic environment.

According to some example embodiments, an optimal network configuration is a network configuration achieving the best performance target for a network metric. For example, an optimal network configuration is a network configuration achieving the performance target for a network metric, which is higher than a certain threshold. As a further example, an optimal network configuration may be considered as a network configuration, which achieves a maximum QoS for users of the network, e.g., a QoS, which is higher than a certain threshold.

In the following, this is further described by referring to some further detailed example embodiments.

According to some example embodiments, a pre-action controller for CFs is proposed, which determines the optimal configuration for the system by resolving existing configuration conflicts among the CFs. The controller determines the optimal configuration for the network beforehand, so that the users get maximum QoS when the selected (optimal) configuration is applied. The controller is a separate function from the CFs, one layer above the CFs in the operational hierarchy and may be seen as part of the operating environment for the CFs, as shown in FIG. 3. FIG. 3 shows the controller 31 and a plurality of cognitive functions (CF) 32 to 35. The controller is characterized by the following:

1. The controller is used to determine the optimal configuration for the system for a given network state.

2. During the process of determining the optimal configuration, if there occurs any conflict between two or multiple CFs over a particular parameter/interest, the controller resolves the conflict instantaneously.

3. In case of a conflict, the controller takes configuration sets from all conflicting CFs as inputs. Each CF provides the controller with the configuration set which is most favorable for the CF's objectives and which is expected to deliver the most utility according to the CF's objective.

4. Along with the most favorable configuration set, each CF also sends a utility function which maps each configuration value to the utility the functions achieve using that value.

5. Based on all the inputs, the controller determines the optimal configuration for the system. Using Nash's social welfare function, the controller ensures to resolve conflicts and to compute the optimal configuration for the whole system.

6. The output of the controller, the optimal system configuration, is used to reconfigure either the CFs or the network. The controller may reconfigure the CFs so that they now use the compromise, optimal configuration for any future network control actions, or the controller may directly configure the network with the compromise, optimal configuration.

Figure 4:
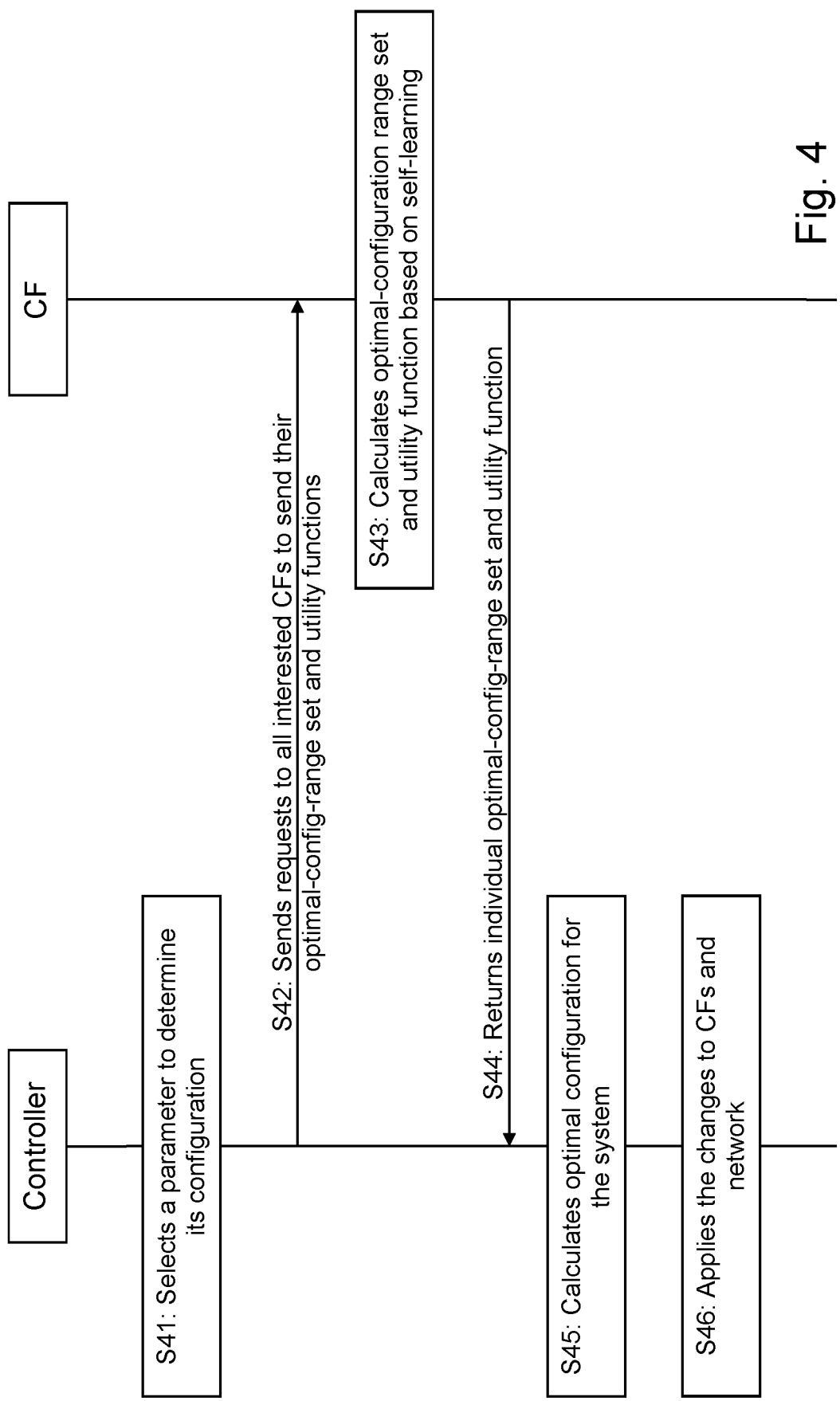
FIG. 4 shows a sequential operational diagram of a system according to an example embodiment.

The sequence of information exchange between the controller and the CFs is shown in FIG. 4, which shows a sequential operational diagram of the system.

In S41, the controller selects a parameter to determine its configuration. In S42, the controller sends requests to all interested CFs to send their optimal-configuration-range set and utility functions. In S43, each CF calculates the optimal-configuration-range set and utility function based on self-learning. In S44, the CF returns the individual optimal-configuration-range set and utility function to the controller. In S45, the controller calculates the optimal configuration for the system, and in S46, the controller applies the changes to the CFs and the network.

In the following, examples for workflows of the CF and the controller are described by referring to FIGS. 5 and 6.

As each CF is a learning function itself, it can generate its favourable configuration set, which is defined as optimal-configuration-range set. Within this set, the objective (output) of the CF always lies within a certain percentage (value of which to be decided by the network operator) of its maximum objective value (output). An optimal-config-range set has the following structure: $[\min_{config}, \max_{config}]$ where $\min_{config}$ denotes the minimum value and $\max_{config}$ denotes the maximum value of the set.

As each CF is a learning agent, it continuously learns the output and based on the learning, after every fixed time interval, it generates the optimal-configuration-range set (also referred to as optimal-config-range set) so that, whenever the controller asks the CF for its optimal-configuration-range set, the CF always has the latest one ready. Every time the CF generates a new optimal-configuration-range set, it checks if the newly generated set is same as the previous one. If they are same, then the CF does nothing and continues with its usual operations. This workflow is depicted in FIG. 5.

If the newly generated set is different from previous one (the change can happen for several reasons like environmental change, change in network configuration parameter (NCP, etc.), the CF sends a request to the controller to recalculate the configuration. As different CFs have different objectives with different dimensions, it is recommended to convert them into the same scale to make decision making by the controller easier. To do so, each CF maps the values of its objective (or, output) to a common utility scale defined a priori either by the network operator or provided by the controller. An example scale may be [0:10], where 0 indicates the lowest utility (no value at all) and 10 indicates the highest possible value of its objective. The mapping function, thus generated, is denoted as utility function. A utility function is denoted by f(p), where p is the configuration and corresponding to a particular p, f(p) provides the utility value of the CF in the predefined scale. An example utility function may be an AQI proposed in document WO 2018/233818 A1 (Application no. PCT/EP2017/065160, "Coordinated network optimization by cognitive network management").

Hence, in general, the utility function of a network automation function such as a CF describes the input-output relationship of the CF. The output may be an output in a universal predetermined scale.

Once CF decides to send its optimal-configuration-range set to the controller (for either, the controller asked, or, it requests the controller itself), the CF delivers both the optimal-configuration-range set and the utility function to the controller in a tuple which has the following structure: $\{[\min_{config}, \max_{config}], f(p)\}$.

This is summarized in the following by referring to FIG. 5. In detail, in S51, the CF learns the transfer function, the input-output relationship for the CF's objective(s). In S52, the CF learns the optimal-configuration-range set. In S53, the CF determines whether the optimal-configuration-range set is the same as a previous one (e.g., the optimal-configuration-range set learned immediately previously). If it is the same (Yes in S53), the process returns to S51. However, if it is not the same (No in S54), the CF generates the utility function in S54. After this, the CF sends the set and the utility function to the controller in S55.

In the following, the workflow of the controller is described by referring to FIG. 6. This workflow of a controller, as described in FIG. 6, is easy to implement.

Figure 5:
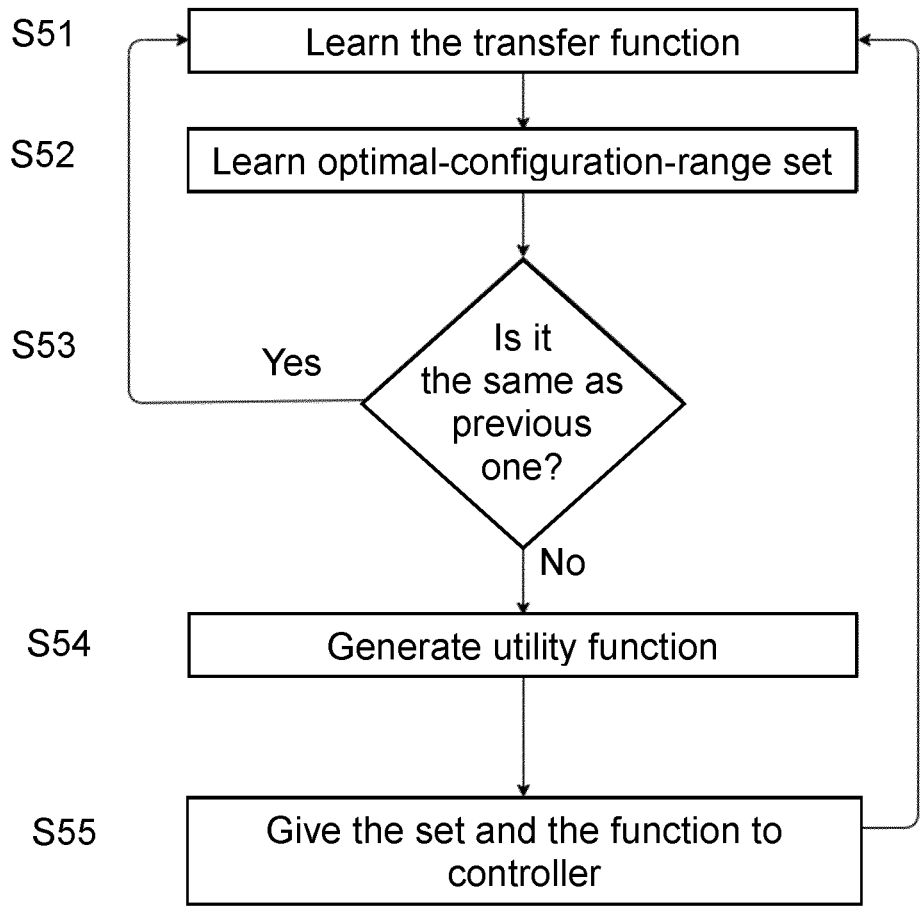
FIG. 5 shows a workflow of a CF according to an example embodiment.
Figure 6:
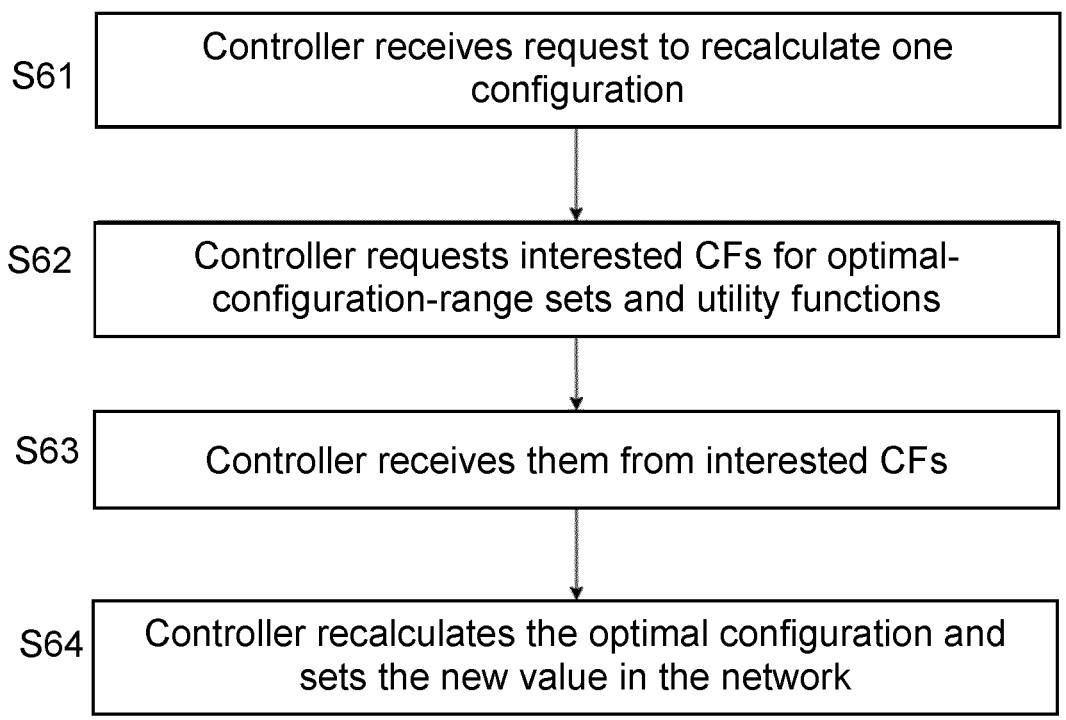
FIG. 6 shows a workflow of a controller according to an example embodiment.

In S61, whenever a CF wants to change a configuration (for reasons described in above in connection with the workflow of the CF shown in FIG. 5), it sends a request to the controller and the controller receives the request.

In S62, upon receiving the new request, the controller sends requests to interested CFs (all the CFs who use the same configuration, e.g., the same control parameter), asking them to send their individual optimal-configuration-range sets and utility functions.

In S63, the controller receives all the necessary information from the interested CFs.

Then, in S64, the controller recalculates the optimal configuration (as will be described in the following), sends them back to the interested CFs and makes the necessary changes in the network.

In the following, calculation of the optimal configuration as carried out in S64 is described.

The main functionality of the controller is to calculate a configuration, from a set of configurations proposed by the CFs, which is optimal for their combined interest. According to an example embodiment, for the calculation of the configuration, Nash's social welfare function is used (J. Nash. The Bargaining Problem. Econometrica, 18-2, 155-162. 1950), which provides an optimal solution in such a scenario.

Calculation of the optimal configuration is easy to implement. After receiving optimal-configuration-range sets from the interested CFs, the controller combines them into a single combined-configuration-range set by taking the lowest and highest values from all the optimal-configuration-range sets. For example, it is assumed that $F_1$, $F_2$ and $F_3$ are three CFs interested in a certain configuration and they send the following information to the controller respectively: $\{[p_1^{min,F1}, p_1^{max,F1}], f_1(p_1)\}$, $\{[p_1^{min,F2}, p_1^{max,F2}], f_2(p_1)\}$ and $\{[p_1^{min,F3}, p_1^{max,F3}], f_3(p_1)\}$. To generate the combined-configuration-range set, the controller takes the minimum value from $\{p_1^{min,F1}, p_1^{min,F2}, p_1^{min,F3}\}$ (this value is denoted as $\min_{p1}$) and maximum value from $\{p_1^{max,F1}, p_1^{max,F2}, p_1^{max,F3}\}$ (this value is denoted as $\max_{p1}$) and the combined-configuration-range set looks like: $[\min_{p1}, \max_{p1}]$.

After generating the combined-configuration-range set, the controller takes as many samples as possible between $\min_{p1}$ and $\max_{p1}$, and, for each sample value, it calculates the product of all the utility functions. For example, if $p_{11}$ is a sampled value which lies between $\min_{p1}$ and $\max_{p1}$, then for $p_{11}$, controller calculates the product: $f_1(p_{11})*f_2(p_{11})*f_3(p_{11})$. In this way, for each sampled value, the controller calculates the product and for that particular sampled value for which the product is maximum, is selected as the optimal configuration.

If for two sampled values, the products are same and maximum, then that sampled value is selected for optimal configuration for which the outputs of the utility functions are close to one another. Following the previous example, it is assumed that $p_{11}$ and $p_{12}$ are two sampled values which lie between $\min_{p1}$ and $\max_{p1}$. It is also assumed that $f_1(p_{11})=8$, $f_2(p_{11})=3$, $f_3(p_{11})=1$ and $f_1(p_{12})=4$, $f_2(p_{12})=3$, $f_3(p_{12})=2$. In both cases the product of the outputs of the utility functions are equal (24). However, as in this system it is considered that there is no assignment of any weight to the CFs or to their outputs, it is assumed that all CFs have equal weightage in the system and thus the case is selected where the outputs of the utility functions are close to one another ($p_{12}$ in the previous example). The closeness of the values can be measures calculating the standard deviation of the outputs. The lower the standard deviation, the close are the values to each other.

Figure 7:
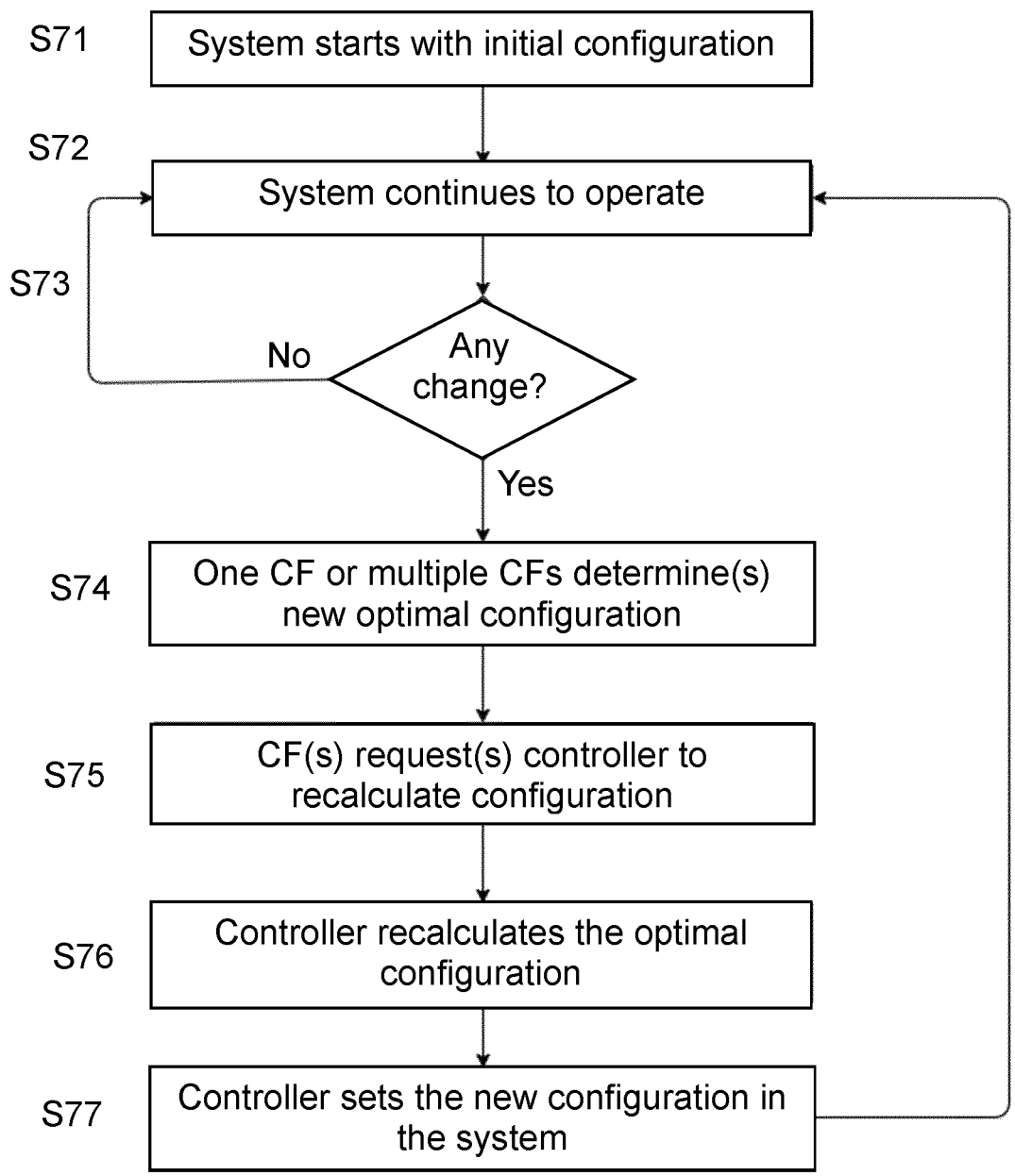
FIG. 7 shows a workflow of a whole system according to an example embodiment.

In the following, the workflow of the whole system is described by referring to FIG. 7. It is assumed that, when the system starts, its loaded with an initial configuration which is set manually, as shown in S71. The system then continues to operate as shown in S72. Over the time, the CFs start learning and determining the optimal configuration for individual self in a certain scenario. When no change occurs in the network (No in S73), the process returns to S72 and continues to operate.

Whenever a change occurs in the network (Yes in S73), optimal configuration for a CF may change (S74) and whenever a CF detects a change in its optimal-configuration-range set, it sends a request to the controller to recalculate the configuration (S75). The controller recalculates the configuration (as described above in connection with FIG. 6) (S76) and applies the new configuration in the system (S77) and the system continues to operate (S72) until another CF observes another change and sends another request for recalculation. In this way the system always changes its optimal configuration whenever the environment changes.

Figure 8:
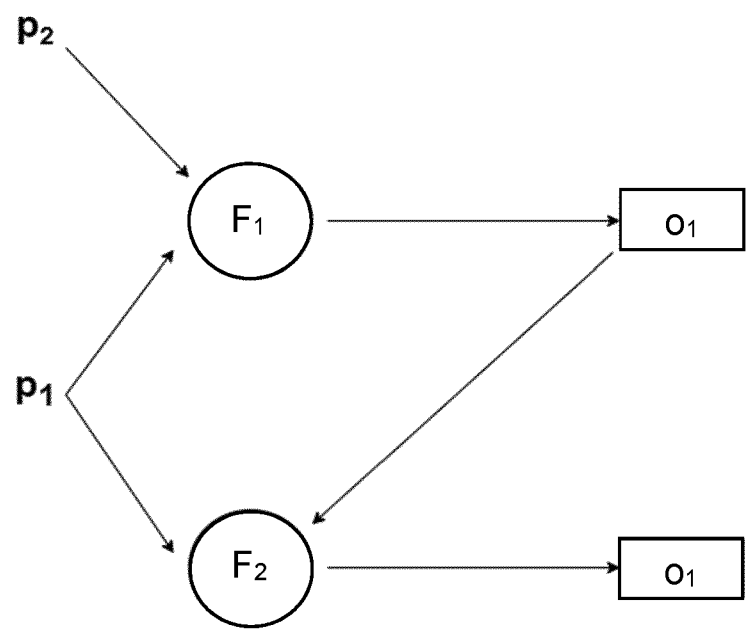
FIG. 8 shows a model for showing different types of conflicts in CFs according to an example embodiment.

In the following, an example is described by referring to FIG. 8, how conflicts arise among the CFs. The CFs are modelled as agents in a MAS. It is assumed that $F_1$ and $F_2$ are two CFs which have objectives $o_1$ and $o_2$ respectively. Parameters $p_1$ and $p_2$ are inputs to these functions as shown in FIG. 8. The optimal configuration for the system, in this case, is determined by calculating the optimal values of $p_1$ and $p_2$ for $F_1$ and $F_2$. To resolve the conflicts between $F_1$ and $F_2$ over the values of $p_1$ and $p_2$ the controller as described in connection with FIG. 6 is used.

The controller has to determine the values of two parameters in this case—$p_1$ and $p_2$. While determining the optimal value for $p_1$, the controller finds that both $F_1$ and $F_2$ share this parameter. So, the controller asks both of them to send their favourable set of values for $p_1$ as well as the utility function for it. Let us assume that $F_1$ returned the utility function $f_1(p_1)$ and the favourable set for $p_1$ as: $[p_1^{min,F1}, p_1^{max,F1}]$. Similarly, $F_2$ returned the utility function $f_2(p_1)$ and the favourable set for $p_1$ as: $[p_1^{min,F2}, p_1^{max,F2}]$.

After receiving these information, the controller combines these two sets to generate a new set r. Maximum value in r is the maximum of $p_1^{max,F1}$ and $p_1^{max,F2}$ and the minimum value in r is the minimum of $p_1^{min,F1}$ and $p_1^{min,F2}$. Then, the controller samples as many values as possible within maximum and minimum of r and for each sample, it calculates the product of $f_1(p_1) \cdot f_2(p_1)$. The value of $p_1$, for which the product is maximum, is the optimal value for both of them. The controller may reconfigure the CFs so that both of them use this new value of $p_1$, or, may directly configure the network with this value. After the optimal value of $p_1$ for the system is determined, the controller follows the same way for determining the optimal value of rest of the parameters ($p_2$) for the system.

Hence, according to some example embodiments it is proposed how several learning entities (e.g., CFs), each of which works independently, can work together and resolve conflicts rising among them. Hence, a mechanism for CFs is provided to resolve conflicts prior to executing actions and determine optimal configuration in a dynamic environment.

The above-described example embodiments are only examples and may be modified.

For example, in an example embodiment, for the calculation of the configuration, the Nash's social welfare function is used. However, also other functions may be applied.

Moreover, according to some example embodiments, the controller processes the configuration sets received from the CFs un-weighted. However, alternatively, the different weights may be associated to the configuration sets received from different CFs.

Names of network elements, protocols, and methods are based on current standards. In other versions or other technologies, the names of these network elements and/or protocols and/or methods may be different, as long as they provide a corresponding functionality.

In general, the example embodiments may be implemented by computer software stored in the memory (memory resources, memory circuitry) 12, 22 and executable by the processor (processing resources, processing circuitry) 11, 21 or by hardware, or by a combination of software and/or firmware and hardware.

As used in this application, the term "circuitry" refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The memory (memory resources, memory circuitry) 12, 22 may be of any type suitable to the local technical environment and may be implemented using any suitable data storage technology, such as semiconductor based memory devices, magnetic memory devices and systems, optical memory devices and systems, fixed memory and removable memory, and non-transitory computer-readable media. The processor (processing resources, processing circuitry) 11, 21 may be of any type suitable to the local technical environment, and may include one or more of general purpose computers, special purpose computers, microprocessors, digital signal processors (DSPs) and processors based on a multi core processor architecture, as non-limiting examples.

The scope of protection sought for various example embodiments is set out by the independent claims. Examples and features, if any, described in this specification that do not fall under the scope of the independent claims are to be interpreted as examples useful for understanding various example embodiments.

The invention claimed is:

1. An apparatus, comprising:
   at least one processor and at least one memory including computer program code, the at least one memory and the computer program code configured to, with the at least one processor, cause the apparatus at least to perform:
   receiving configuration sets from at least two network automation functions, each network automation function determining an associated configuration set that is optimal for achieving an objective of the network automation function, and
   determining an optimal network configuration based on the associated configuration set received from the at least two network automation functions,
   wherein an optimal network configuration is a network configuration achieving the best performance target for a network metric, or a network configuration achieving a performance target for a network metric, which is higher than a certain threshold, wherein an optimal network configuration is a network configuration which achieves a maximum quality of service (QOS) for users of the network and is higher than a certain threshold,
   wherein the apparatus further comprises a pre-action controller for network automation functions that determines an optimal network configuration by resolving existing configuration conflicts among the network automation functions,
   wherein the pre-action controller determines the optimal configuration for the network beforehand, so that the users of the network get maximum QoS when the selected optimal configuration is applied,
   wherein the pre-action controller is a separate function from the network automation functions, one layer above the network automation functions in operational hierarchy,
   wherein during the process of determining the optimal configuration, if there occurs any conflict between two or multiple network automation functions over a particular parameter or interest, the pre-action controller resolves the conflict instantaneously,
   wherein the pre-action controller receives configuration sets from all conflicting network automation functions as inputs with each network automation function providing the controller with the configuration set that is most favorable for the network automation function's objectives and which is expected to deliver the most utility according to the network automation function's objective,
   wherein the pre-action controller receives from the conflicting network automation functions as inputs utility functions that map each configuration value to the utility the network automation functions achieve using that value,
   wherein based on all the inputs, the pre-action controller determines an optimal system configuration using Nash's social welfare function to resolve conflicts and to compute the optimal network configuration,
   wherein the output of the pre-action controller, the optimal network configuration, is used to reconfigure either the network automation functions for the network,
   wherein the pre-action controller reconfigures the network automation functions so that they now use the optimal network configuration for any future network control actions, or the pre-action controller may directly configure the network with the optimal network configuration.

2. The apparatus according to claim 1, wherein the at least one memory and the computer program code are configured to, with the at least one processor, cause the apparatus to further perform:
   determining that a conflict is present among the at least two network automation functions by determining that the configuration sets of the at least two network automation functions do not match with each other, and that utility functions received from the at least two network automation functions do not match with each other, the utility functions describing the input-output relationship of the network automation functions, respectively;
   determining the optimal network configuration by solving the conflict among the at least two network automation functions.

3. The apparatus according to claim 2, wherein each configuration set comprises a range for a parameter having a minimum value and a maximum value, the parameters being not the same for the configuration sets of the at least two network automation functions, and the at least one memory and the computer program code are configured to, with the at least one processor, cause the apparatus to further perform:
   determining that a conflict is present by determining that the minimum values and the maximum values of ranges for the parameter of the configuration sets of the at least two network automation functions do not match with each other.

4. The apparatus according to claim 1, wherein the at least one memory and the computer program code are configured to, with the at least one processor, cause the apparatus to further perform:
   determining the optimal network configuration also based on a plurality of utility functions applied by the at least two network automation functions.

5. The apparatus according to claim 1, wherein the at least one memory and the computer program code are configured to, with the at least one processor, cause the apparatus to further perform:

receiving a request from at least one network automation function to re-determine the optimal network configuration, the request comprising a modified configuration set, and sending, in response to receiving the modified configuration set, a request to at least one other network automation function to provide configuration sets.

6. A method, comprising:

receiving configuration sets from at least two network automation functions, each network automation function determining an associated configuration set such that is optimal for achieving an objective of the network automation function, and determining an optimal network configuration based on the associated configuration set received from the at least two network automation functions, wherein an optimal network configuration is a network configuration achieving the best performance target for a network metric, or a network configuration achieving a performance target for a network metric, which is higher than a certain threshold, wherein an optimal network configuration is a network configuration which achieves a maximum quality of service (QOS) for users of the network and is higher than a certain threshold, wherein a pre-action controller for network automation functions determines an optimal network configuration by resolving existing configuration conflicts among the network automation functions, wherein the pre-action controller determines the optimal configuration for the network beforehand, so that the users of the network get maximum QoS when the selected optimal configuration is applied, wherein the pre-action controller is a separate function from the network automation functions, one layer above the network automation functions in operational hierarchy, wherein during the process of determining the optimal configuration, if there occurs any conflict between two or multiple network automation functions over a particular parameter or interest, the pre-action controller resolves the conflict instantaneously, wherein the pre-action controller receives configuration sets from all conflicting network automation functions as inputs with each network automation function providing the controller with the configuration set that is most favorable for the network automation function's objectives and which is expected to deliver the most utility according to the network automation function's objective, wherein the pre-action controller receives from the conflicting network automation functions as inputs utility functions that map each configuration value to the utility the network automation functions achieve using that value, wherein based on all the inputs, the pre-action controller determines an optimal system configuration using Nash's social welfare function to resolve conflicts and to compute the optimal network configuration, wherein the output of the pre-action controller, the optimal network configuration, is used to reconfigure either the network automation functions for the network, wherein the pre-action controller reconfigures the network automation functions so that they now use the optimal network configuration for any future network control actions, or the pre-action controller may directly configure the network with the optimal network configuration.

7. The method to claim 6, further comprising:

determining that a conflict is present among the at least two network automation functions by determining that the configuration sets of the at least two network automation functions do not match with each other, and that utility functions received from the at least two network automation functions do not match with each other, the utility functions describing the input-output relationship of the network automation functions, respectively;

determining the optimal network configuration by solving the conflict among the at least two network automation functions.

8. The method according to claim 7, wherein each configuration set comprises a range for a parameter having a minimum value and a maximum value, the parameter being the same for the configuration sets of the at least two network automation functions, and the method further comprises:

determining that a conflict is present by determining that the minimum values and the maximum values of ranges for the parameter of the configuration sets of the at least two network automation functions do not match with each other.

9. The method according to claim 6, further comprising:

determining the optimal network configuration also based on a plurality of utility functions applied by the at least two network automation functions.

10. The method according to claim 6, further comprising:

receiving a request from at least one network automation function to re-determine the optimal network configuration, the request comprising a modified configuration set, and sending, in response to receiving the modified configuration set, a request to at least one other network automation function to provide configuration sets.

* * * * *